US012743305B2

(12) United States Patent
Lee

(10) Patent No.: US 12,743,305 B2
(45) Date of Patent: Sep. 22, 2026

(54) METHOD AND APPARATUS FOR COLLABORATIVE TASK PLANNING FOR ARTIFICIAL INTELLIGENCE AGENTS

(71) Applicant: ELECTRONICS AND TELECOMMUNICATIONS RESEARCH INSTITUTE, Daejeon (KR)

(72) Inventor: Yong-Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 703 days.

(21) Appl. No.: 18/311,792

(22) Filed: May 3, 2023

(65) Prior Publication Data

US 2024/0176653 A1 May 30, 2024

(30) Foreign Application Priority Data

Nov. 24, 2022 (KR) ........................ 10-2022-0159460

(51) Int. Cl.
*G06F 9/48* (2006.01)
*G06F 8/30* (2018.01)

(52) U.S. Cl.
CPC .............. *G06F 9/4881* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 10,192,195 B1 * | 1/2019 | Brazeau | B25J 9/1661 |
| 11,899,839 B1 * | 2/2024 | Skorheim | G06F 3/013 |
| 12,070,847 B1 * | 8/2024 | Ebrahimi Afrouzi | B25J 9/1684 |
| 12,198,430 B1 * | 1/2025 | Kottur | G06F 16/9024 |
| 2012/0143910 A1 | 6/2012 | Park et al. | |
| 2017/0083005 A1 * | 3/2017 | Hickman | A01N 25/10 |
| 2019/0080252 A1 * | 3/2019 | Shinn | G06F 8/30 |
| 2020/0103911 A1 | 4/2020 | Ma et al. | |
| 2020/0171650 A1 * | 6/2020 | Hallock | B25J 9/009 |

(Continued)

FOREIGN PATENT DOCUMENTS

| | | |
|---|---|---|
| JP | 2022-170790 | 11/2022 |
| JP | 2022-173244 | 11/2022 |

(Continued)

OTHER PUBLICATIONS

Chang, Yun, Luca Ballotta, and Luca Carlone. "D-Lite: Navigation-Oriented Compression of 3D Scene Graphs for Multi-Robot Collaboration." arXiv preprint arXiv:2209.06111 (2022). (Year: 2022).*

(Continued)

*Primary Examiner* — Frank D Mills
(74) *Attorney, Agent, or Firm* — KILE PARK REED & HOUTTEMAN PLLC

(57) ABSTRACT

Disclosed herein is a method for task planning for collaboration of artificial intelligence (AI) agents. The method includes generating a scene graph using an image acquired by an AI agent and a human instruction and generating a machine instruction set for objects in the scene graph, and the scene graph includes relevance information between each of the objects in the scene graph and the human instruction.

18 Claims, 11 Drawing Sheets

MASTER PLAN FOR ACTUAL TASK 2

SUBPLAN FOR ACTUAL TASK 2

- 5. LEARN A NEW LABEL "GLUCOSE IV" IN COLLABORATION WITH EACH OTHER

(56) References Cited

U.S. PATENT DOCUMENTS

| | | | | |
|---|---|---|---|---|
| 2020/0293995 | A1* | 9/2020 | El Shawwa | G06Q 10/0635 |
| 2020/0356829 | A1* | 11/2020 | Costabello | G06F 40/56 |
| 2021/0086353 | A1* | 3/2021 | Shah | B25J 13/08 |
| 2021/0224579 | A1 | 7/2021 | Jones et al. | |
| 2021/0229281 | A1* | 7/2021 | Natarajan | B25J 9/163 |
| 2022/0055221 | A1 | 2/2022 | Ko et al. | |
| 2022/0126445 | A1* | 4/2022 | Zhu | B25J 9/161 |
| 2022/0198813 | A1 | 6/2022 | Chiu et al. | |
| 2023/0134924 | A1* | 5/2023 | Sun | B25J 9/0084<br>700/259 |
| 2023/0162494 | A1* | 5/2023 | Banerjee | G05D 1/0016<br>382/153 |
| 2023/0311335 | A1* | 10/2023 | Hausman | B25J 11/0005<br>700/246 |
| 2024/0078429 | A1 | 3/2024 | Finn et al. | |
| 2024/0408762 | A1* | 12/2024 | Landernäs | G05B 19/4189 |
| 2026/0031916 | A1* | 1/2026 | Li | H04B 17/309 |

FOREIGN PATENT DOCUMENTS

| | | |
|---|---|---|
| KR | 10-2019-0044683 | 4/2019 |
| KR | 10-2063181 | 3/2020 |
| KR | 10-2020-0087298 | 7/2020 |
| KR | 10-2022-0146726 | 11/2022 |

OTHER PUBLICATIONS

Guo, Junfu, Changhao Li, Xi Xia, Ruizhen Hu, and Ligang Liu. "Asynchronous Collaborative Autoscanning with Mode Switching for Multi-Robot Scene Reconstruction." arXiv preprint arXiv:2210.04413 (2022). (Year: 2022).*

* cited by examiner

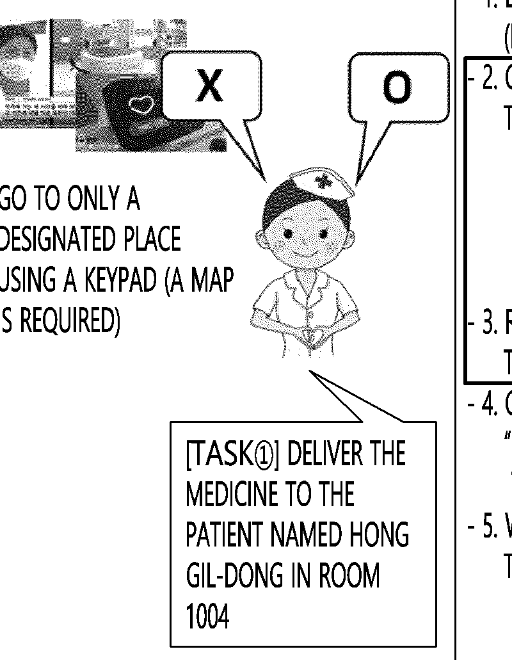

MASTER PLAN FOR ACTUAL TASK 1

- 1. DETERMINE THAT A NURSE DIDN'T GIVE MEDICINE (DOESN'T KNOW HOW TO GET MEDICINE)
- 2. COLLABORATE WITH A NEARBY AGENT IN ORDER TO RECEIVE THE MEDICINE OF THE PATIENT IN ROOM 1004
    - 2-1. GIVE INSTRUCTION TO A ROBOT NEAR THE PHARMACY AND REQUEST THE ROBOT TO GET THE MEDICINE
    - 2-2. RESERVE A PATH AND RECEIVE THE PRODUCT
- 3. RECEIVE THE MEDICINE FROM THE AGENT AND AGAIN SEARCH THE SHORTEST PATH FROM THE CURRENT LOCATION
- 4. GO TO ROOM 1004, CALL THE PATIENT NAMED "HONG GIL-DONG", GIVE PRECAUTION TO BE AWARE OF WHEN TAKING THE MEDICINE
- 5. WHEN THE PATIENT DIDN'T TAKE MEDICINE, RECOMMEND TO TAKE THE MEDICINE AND FIND WATER.
    - 5-1. LOOK FOR A REFRIGERATOR, OPEN THE REFRIGERATOR, AND TAKE WATER OUT OF THE REFRIGERATOR,
    - 5-2. PROVIDE WATER TO THE PATIENT, 5-3. CONFIRM THAT THE PATIENT TAKES THE MEDICINE AND RETURN

SUBPLAN FOR ACTUAL TASK 1

- 2-1. RECEIVE AN INSTRUCTION FROM THE PHARMACY
- 2-2. RESERVE A PATH, RECEIVE A PRODUCT, AND DELIVER THE PRODUCT
- 3. RECEIVE MEDICINE FROM AN AGENT AND DELIVER THE SAME

FIG. 8

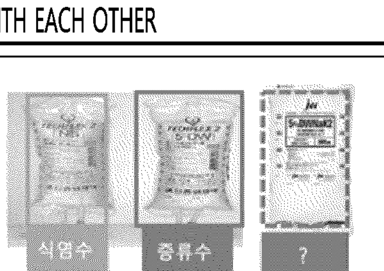
FIG. 9

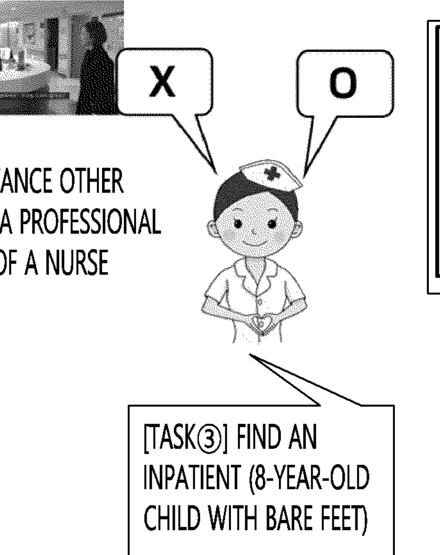

MASTER PLAN FOR ACTUAL TASK 3

- 1. IDLE AGENTS IN A COLLABORATION GROUP ARE ASSIGNED TO REGIONS (A, B, C AND D) AND LOCATE THE CHILD, AND THE AGENT ITSELF SEARCHES REGION A.
- 2. THE AGENT RECEIVES AND COLLECTS SCENE GRAPHS AT THE RESPECTIVE LOCATIONS

SUBPLAN FOR ACTUAL TASK 3

- 1. SEARCH THE DESIGNATED REGION (B) IN RESPONSE TO THE REQUEST TO FIND THE PATIENT FROM THE AGENT
- 2. ASSIGN THE REGION (B) TO THE AGENT

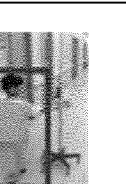

FIG. 10

METHOD AND APPARATUS FOR COLLABORATIVE TASK PLANNING FOR ARTIFICIAL INTELLIGENCE AGENTS

CROSS REFERENCE TO RELATED APPLICATION

This application claims the benefit of Korean Patent Application No. 10-2022-0159460, filed Nov. 24, 2022, which is hereby incorporated by reference in its entirety into this application.

BACKGROUND OF THE INVENTION

1. Technical Field

The present disclosure relates to technology for planning tasks for various agents to which artificial intelligence (AI) technology is applied.

More particularly, the present disclosure relates to technology for generating a machine-level instruction set using visual information acquired by an AI agent and a human instruction.

2. Description of the Related Art

General robots in their early stages receive commands and perform determination and actions. Here, tasks are performed according to simple commands limited to the initial intelligence of the robots (e.g., a guide robot delivers a prepared guide speech, a delivery/logistics robot simply travels along a designated path, and the like). In spite of installation of AI technology, it doesn't make a big difference in the intelligence level between the robots, and enhancement is made through upgrade.

Cloud robots are being developed to facilitate concurrent command and control of multiple robots, accumulation of experience data, and centralized determination and action planning based on a cloud by distributing a pretrained learning model, like a brain of AI, to the robots based on the cloud (e.g., updating a guide speech of a guide robot, updating a delivery/logistics robot with additional paths, and the like). However, there is a limitation in which learning and management are limitedly performed according to rules that are set in consideration of training of robots and task planning.

Accordingly, in order to overcome the above-mentioned limitation of the existing technology, technology enabling autonomous action planning through collaborative work between agents is urgently required.

DOCUMENTS OF RELATED ART (Patent Document 1) Korean Patent Application Publication No. 10-2022-0146726, titled "Travel planning device and method and mobile robot applying the same".

SUMMARY OF THE INVENTION

An object of the present disclosure is to generate a detailed task plan using visual information of an AI agent and a human instruction.

Another object of the present disclosure is to make a task plan such that multiple AI agents are able to collaborate with each other.

In order to accomplish the above objects, a method for task planning for collaboration of artificial intelligence (AI) agents according to an embodiment of the present disclosure includes generating a scene graph using an image acquired by an AI agent and a human instruction and generating a machine instruction set for objects in the scene graph. The scene graph includes relevance information between each of the objects in the scene graph and the human instruction.

Here, the machine instruction set may include machine instructions corresponding to a lower level of the human instruction.

Here, generating the machine instruction set may comprise generating the machine instruction set for objects, the relevance information of which is greater than a threshold.

Here, generating the machine instruction set may comprise generating the machine instruction set based on information about an additional AI agent in the vicinity of the AI agent.

Here, the information about the additional AI agent may include information about the location thereof and information about whether collaboration is possible.

Here, generating the machine instruction set may comprise generating the machine instruction set based on the number of AI agents that are located within a preset distance from the AI agent and capable of collaborating with the AI agent.

Here, the method for task planning for collaboration of AI agents according to an embodiment of the present disclosure may further include requesting collaboration from a nearby AI agent when the complexity of performing the machine instruction set is greater than a preset value.

Here, generating the machine instruction set may be performed using an AI neural network trained using training data configured with images, human instructions, and machine instruction sets.

Here, generating the machine instruction set may comprise estimating the number of AI agents required for performing the human instruction based on calculation of the complexity of the human instruction and generating the machine instruction set when the number of nearby AI agents capable of collaborating is greater than the number of AI agents required for performing the human instruction.

Here, generating the scene graph may comprise generating the scene graph using the image and generating a relevance map, including the relevance information between the object in the scene graph and the human instruction, based on the scene graph and the human instruction.

Also, in order to accomplish the above objects, an apparatus for task planning for collaboration of AI agents according to an embodiment of the present disclosure includes memory in which at least one program is recorded and a processor for executing the program. The program includes instructions for performing generating a scene graph using an image acquired by an AI agent and a human instruction and generating a machine instruction set for objects in the scene graph, and the scene graph includes relevance information between each of the objects in the scene graph and the human instruction.

Here, the machine instruction set may include machine instructions corresponding to a lower level of the human instruction.

Here, generating the machine instruction set may comprise generating the machine instruction set for objects, the relevance information of which is greater than a threshold.

Here, generating the machine instruction set may comprise generating the machine instruction set based on information about an additional AI agent in the vicinity of the AI agent.

Here, the information about the additional AI agent may include information about the location thereof and information about whether collaboration is possible.

Here, generating the machine instruction set may comprise generating the machine instruction set based on the number of AI agents that are located within a preset distance from the AI agent and capable of collaborating with the AI agent.

Here, the program may further include an instruction for performing requesting collaboration from a nearby AI agent when the complexity of performing the machine instruction set is greater than a preset value.

Here, generating the machine instruction set may be performed using an AI neural network trained using training data configured with images, human instructions, and machine instruction sets.

Here, generating the machine instruction set may comprise estimating the number of AI agents required for performing the human instruction based on calculation of the complexity of the human instruction and generating the machine instruction set when the number of nearby AI agents capable of collaborating is greater than the number of AI agents required for performing the human instruction.

Here, generating the scene graph may comprise generating the scene graph using the image and generating a relevance map, including the relevance information between the object in the scene graph and the human instruction, based on the scene graph and the human instruction.

BRIEF DESCRIPTION OF THE DRAWINGS

The above and other objects, features, and advantages of the present disclosure will be more clearly understood from the following detailed description taken in conjunction with the accompanying drawings, in which:

FIGS. 8 to 10 are examples of the configuration of a master plan and a subplan according to a human instruction.

DESCRIPTION OF THE PREFERRED EMBODIMENTS

Figure 1:
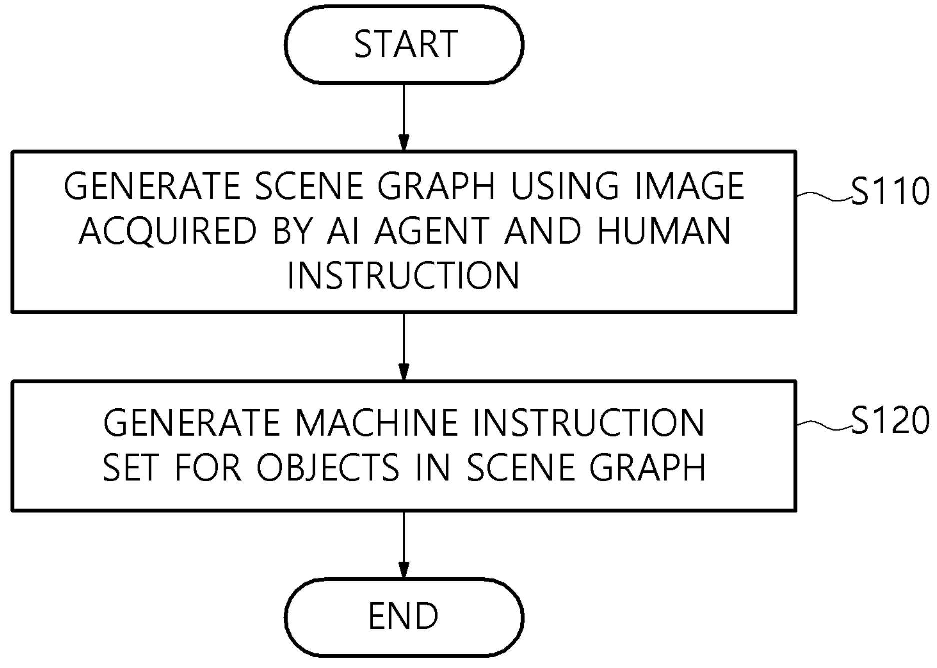
FIG. 1 is a flowchart illustrating a method for task planning for collaboration of AI agents according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

The present disclosure relates to technology for a method in which various agents (robots, autonomous vehicles, drones, intelligent devices, and the like) to which artificial intelligence (AI) technology is applied acquire prior knowledge required for performing tasks (actions according to verbal/nonverbal instructions of humans or other agents) and make a series of instructions, thereby making sequential action plans.

An embodiment of the present disclosure proposes a method in which robots for collaboration between agents are able to freely set their action plans by themselves and share the same with nearby robots so as to enable collaboration therewith.

An embodiment of the present disclosure proposes a method in which multiple robots are able to exhibit human-level intelligence by learning prior knowledge from local data and breaking down a series of instructions. In the proposed method, when a human-level instruction, such as "give me a glass of water", is given, action plans may be made through agent-level instructions depending on the circumstances, such as "locate nearby robots", "look for a refrigerator", "check a table", "open the refrigerator when it is found", "find mineral water", "pick up the mineral water", "close the refrigerator", and "deliver the mineral water to a person".

FIG. 1 is a flowchart illustrating a method for task planning for collaboration of AI agents according to an embodiment of the present disclosure.

The method for task planning for collaboration of AI agents according to an embodiment of the present disclosure may be performed in a collaboration system including a single AI agent or multiple AI agents.

Referring to FIG. 1, the method for task planning for collaboration of AI agents according to an embodiment of the present disclosure includes generating a scene graph using an image acquired by an AI agent and a human instruction at step S110 and generating a machine instruction set for objects in the scene graph at step S120. The scene graph includes relevance information between each of the objects in the scene graph and the human instruction.

Here, the machine instruction set may include machine instructions corresponding to a lower level of the human instruction.

Here, generating the machine instruction set at step S120 may comprise generating the machine instruction set for objects, the relevance information of which is greater than a threshold.

Here, generating the machine instruction set at step S120 may comprise generating the machine instruction set based on information about an additional AI agent in the vicinity of the AI agent.

Here, the information about the additional AI agent may include information about the location thereof and information about whether collaboration is possible.

Here, generating the machine instruction set at step S120 may comprise generating the machine instruction set based on the number of AI agents that are located within a preset distance from the AI agent and capable of collaborating with the AI agent.

Here, although not illustrated in FIG. 1, the method for task planning for collaboration of AI agents according to an embodiment of the present disclosure may further include requesting collaboration from a nearby AI agent when the complexity of performing the machine instruction set is greater than a preset value.

Here, generating the machine instruction set at step S120 may be performed using an AI neural network that is trained using training data configured with images, human instructions, and machine instruction sets.

Here, generating the machine instruction set at step S120 may comprise estimating the number of AI agents required for performing the human instruction based on calculation of the complexity of the human instruction and generating the machine instruction set when the number of nearby AI agents capable of collaboration is greater than the number of AI agents required for performing the human instruction.

Here, generating the scene graph at step S110 may comprise generating the scene graph using the image and generating a relevance map, including the relevance information between the object in the scene graph and the human instruction, based on the scene graph and the human instruction.

Figure 2:
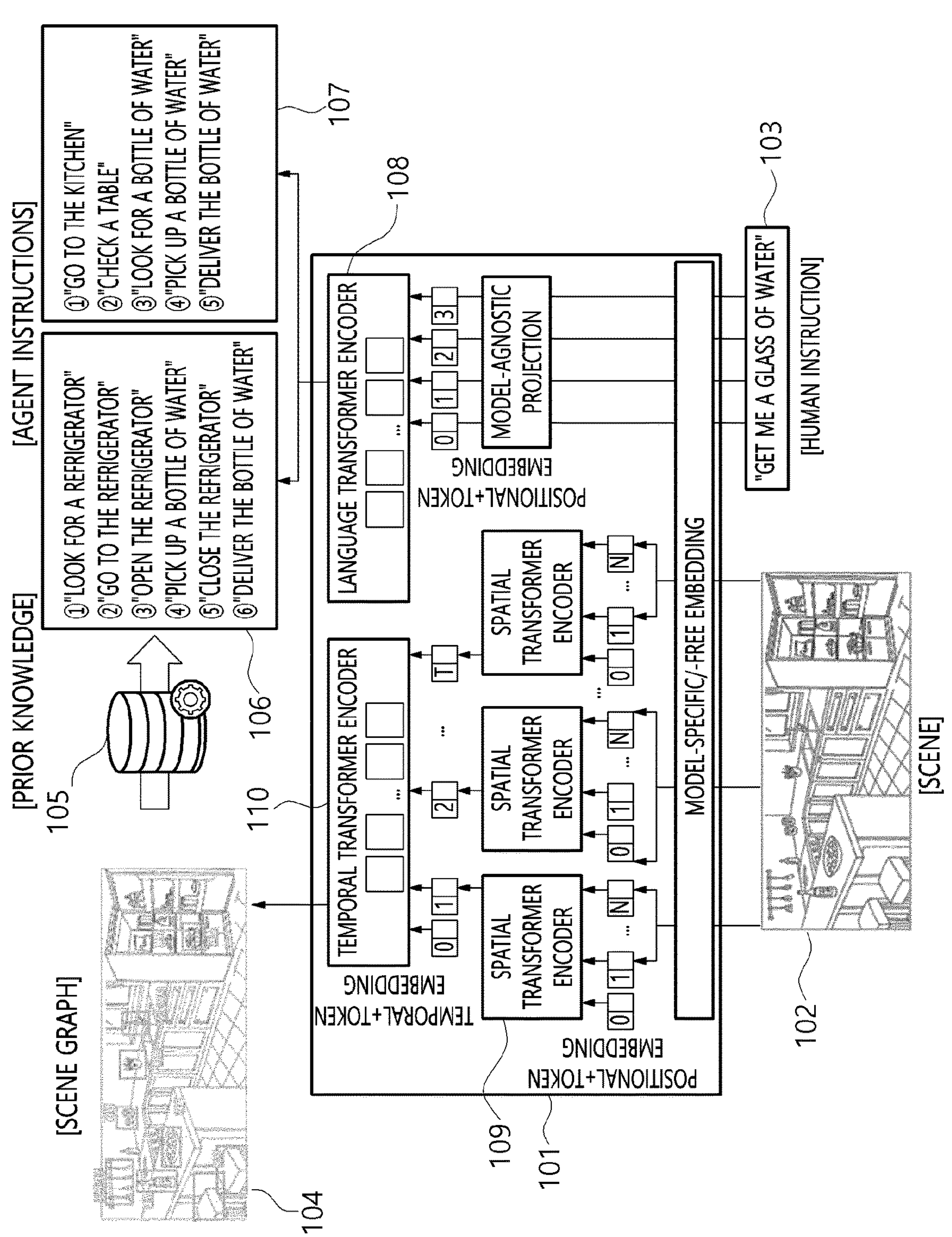
FIG. 2 is a view conceptually illustrating a task plan system according to an embodiment of the present disclosure.

FIG. 2 is a view conceptually illustrating a task plan system according to an embodiment of the present disclosure.

Referring to FIG. 2, in the method according to an embodiment of the present disclosure, input is configured with visual information 102 and a human instruction 103. The visual information 102 indicates a scene that is received as the input of a camera when an agent in which AI technology is installed is freely moving and searching. The human instruction 103 is configured with a verbal/nonverbal expression (an action/motion such as pointing) transferred to the agent.

The system receives the visual information 102 and the human instruction 103 as input and trains a deep-learning model (structure). A pretrained model 101 is largely divided into a part for processing visual information using a temporal encoder 110 and a spatial encoder 109 and a part for processing language information using a language encoder 108. In this way, training is performed, whereby the pretrained model 101 may be generated. In the process in which the AI agent performs inference (which includes recognizing objects/humans, moving/searching in a space, or manipulating/controlling something) using the pretrained model 101, a scene graph 104 is generated from the actual scene through the pretrained model 101, semantic information is understood, and the actual AI agent generates and uses machine-level instructions 106 or 107 using prior knowledge 105. The machine-level instructions 106 or 107 are formed as an instruction set, rather than a single instruction, and may be appropriately used in the system depending on the circumstances.

Here, the scene graph 104 may include relevance information between each of the objects in the scene graph and the human instruction, and the machine-level instruction set may be generated using the relevance information.

Here, the pretrained model 101 may generate a machine-level instruction set using information of a nearby AI agent. For example, the complexity of the machine instruction set may be determined in consideration of the number of nearby AI agents capable of collaboration.

Figure 3:
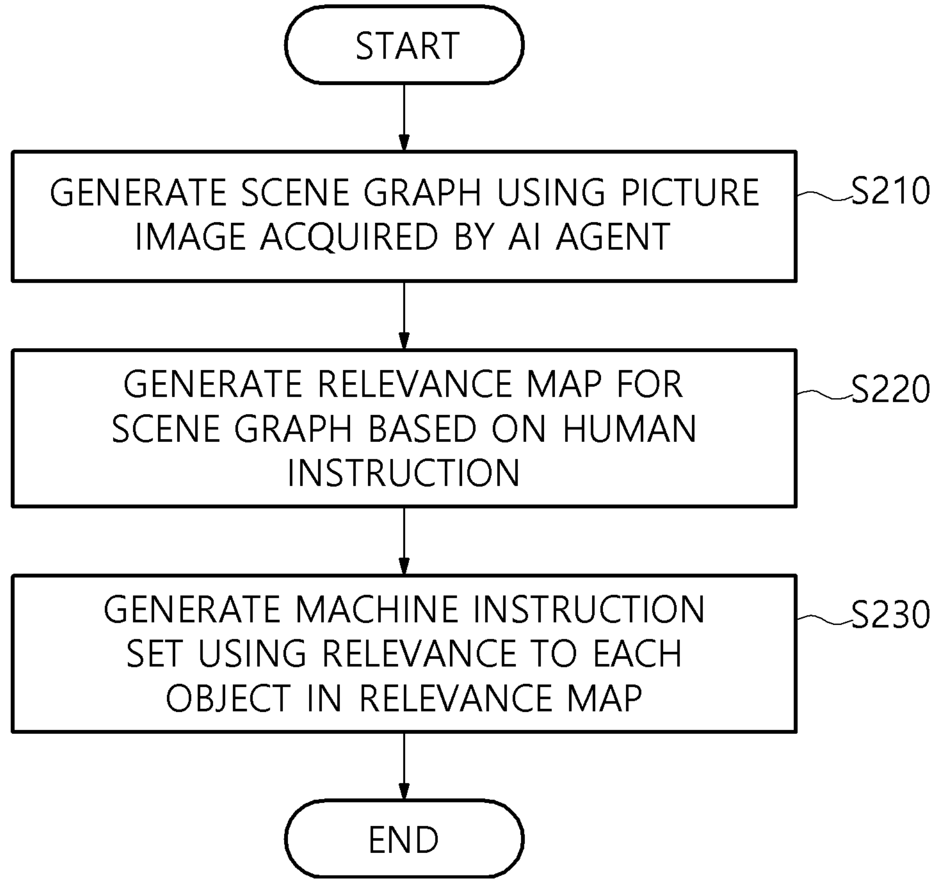
FIG. 3 is a flowchart illustrating a method for generating a task plan according to an embodiment of the present disclosure.

FIG. 3 is a flowchart illustrating a method for generating a task plan according to an embodiment of the present disclosure.

Referring to FIG. 3, the method according to an embodiment of the present disclosure includes generating a scene graph using a picture image acquired by an AI agent at step S210, generating a relevance map for the scene graph based on a human instruction at step S220, and generating a machine instruction set using the relevance of each of the objects in the relevance map at step S230. That is, the AI agent may generate a scene graph, including label information of each object, for an input scene that is input through a camera or the like, and may calculate the relevance between the object in the scene graph and the human instruction. Here, the process of calculating the relevance between the object in the scene graph and the human instruction may be performed using a pretrained AI neural network structure, but the scope of the present disclosure is not limited thereto.

Here, the process of generating the relevance map for the scene graph based on the human instruction at step S220 may be performed only under a specific condition. For example, when an object that is the target of the human instruction is present in the scene graph, a machine instruction set may be immediately generated without the process of generating the relevance map.

Here, the process of generating the machine instruction set at step S230 may comprise requesting collaboration from a nearby AI agent when an object, the relevance of which is greater than a preset value, is not present, among the objects in the relevance map of the AI agent generating the instruction set. For example, when an instruction "get me water" is given, the object satisfying the above condition may be a water purifier, a refrigerator, a water tap, or the like.

Alternatively, when an object having relevance greater than the preset value is not present, the objects in the relevance map are sorted in the order of relevance, and an interface requesting feedback from a user is generated, whereby feedback may be received from the user.

In the above embodiment, an instruction "get me water" is taken as an example, but the human instruction may be an instruction having higher complexity. When the human instruction has high complexity, collaboration of multiple AI agents may be required, in which case the AI agent may check location information and state information of nearby agents and use the same for generation of the machine instruction set.

That is, the complexity of the human instruction is calculated before generation of the machine instruction set, and the machine instruction set may be generated using the complexity and the state information of the nearby AI agents. Conversely, the machine instruction set is generated first, and when it is determined that collaboration of multiple AI agents is required at the time of executing the generated instruction set, the state information of the nearby AI agents may be checked, and collaboration may be requested.

Figure 4:
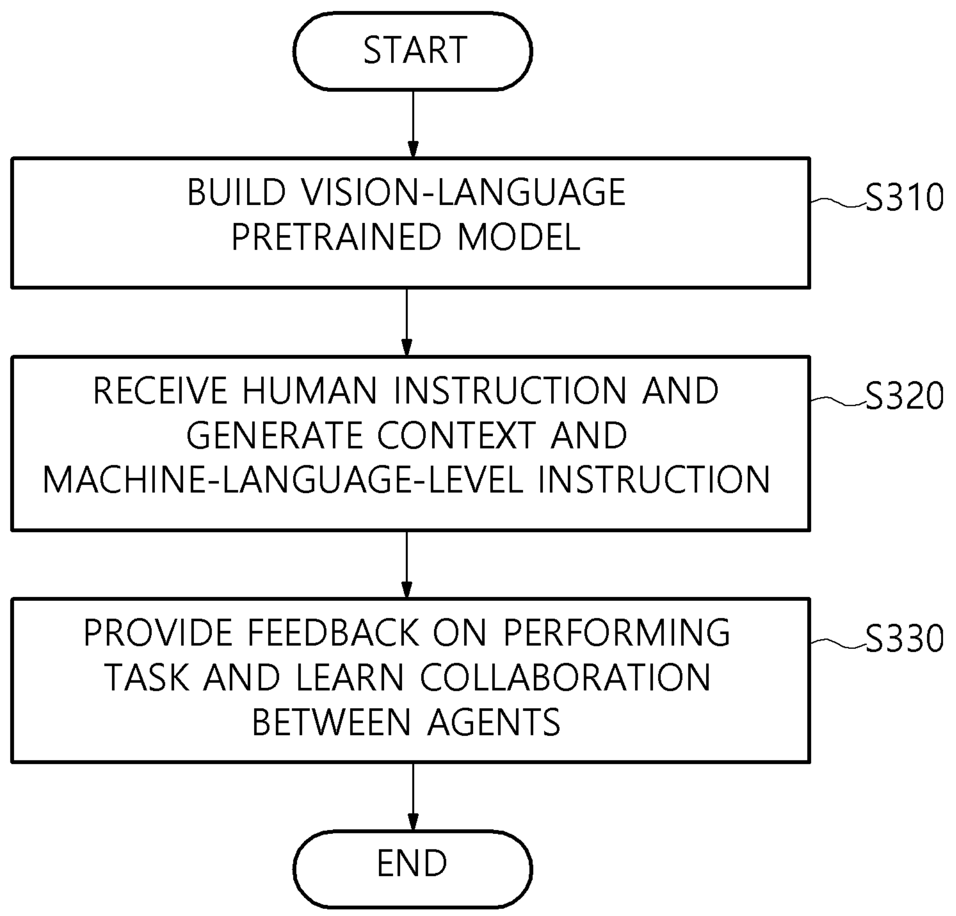
FIG. 4 is a flowchart illustrating a method for generating a task plan according to another embodiment of the present disclosure.

FIG. 4 is a flowchart illustrating a method for generating a task plan according to another embodiment of the present disclosure.

Referring to FIG. 4, the method for making a task plan for collaboration largely breaks down into three steps, which are building a vision-language pretrained model at step S310, receiving a human instruction and generating context and a machine-language-level instruction at step S320, and providing feedback on performing a task and learning collaboration between agents at step S330.

Figure 5:
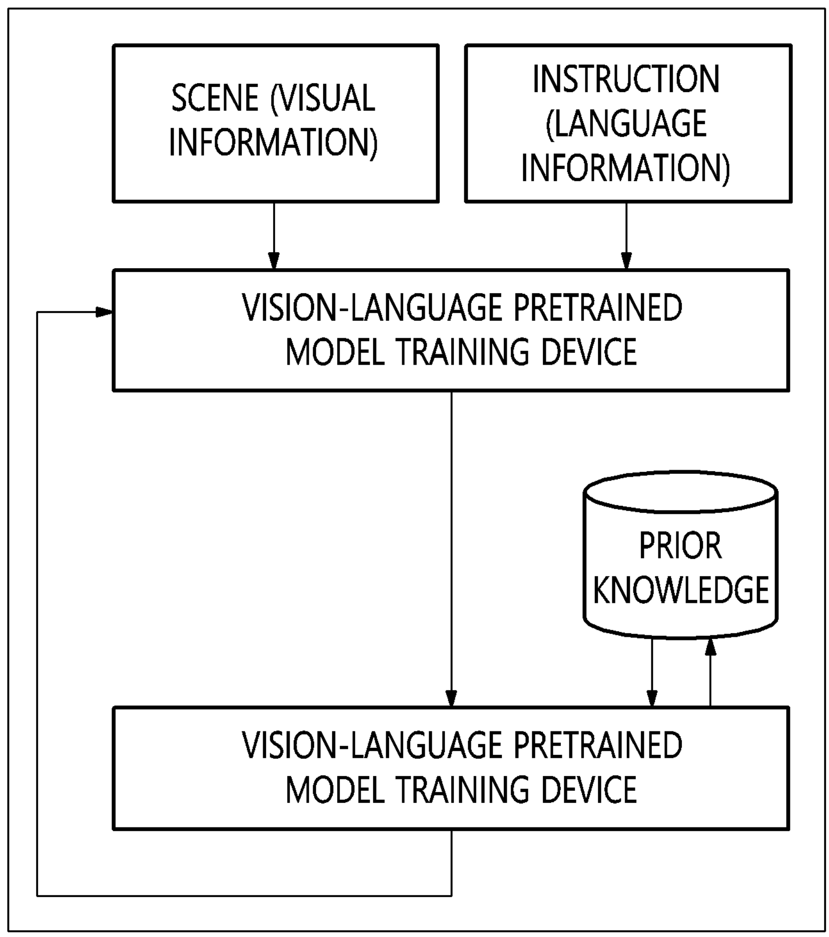
FIG. 5 is a view conceptually illustrating a configuration for building a vision-language pretrained model.

FIG. 5 is a view conceptually illustrating the configuration for building a vision-language pretrained model.

Referring to FIG. 5, at the step of building a vision-language pretrained model, visual information and language information are received, and instructions for making action plans are generated using a vision-language pretrained model training device and prior knowledge.

Figure 6:
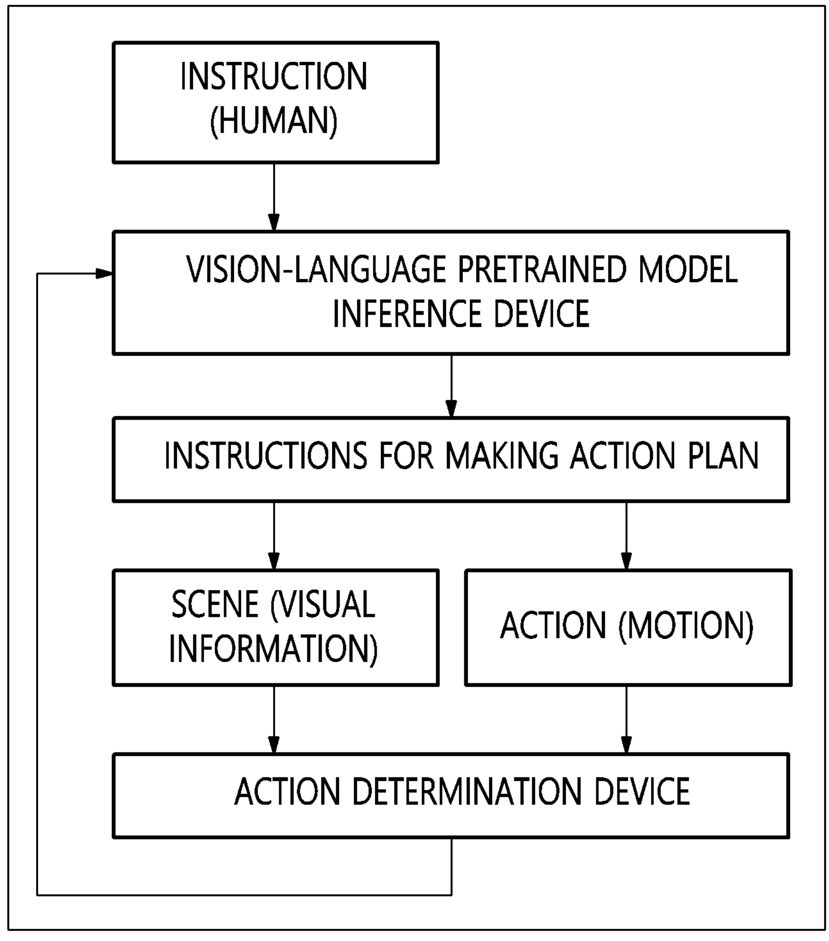
FIG. 6 is a view conceptually illustrating a step of generating a scene graph and a machine-language-level instruction.

FIG. 6 is a view conceptually illustrating a step of generating a scene graph and a machine-language-level instruction.

Referring to FIG. 6, at the step of receiving a human instruction and generating context and a machine-language-level instruction, a human instruction is received, and instructions 211 for making action plans are generated through an inference device, which performs inference using a pretrained model. Then, through visual information and actions, an action determination device may recognize an object, autonomously move, or perform a certain motion/action (picks up an object or open/close something). This is a structure in which the action determination device repeatedly processes instructions for making action plans, visual information, and actions in order to continuously perform inference.

Figure 7:
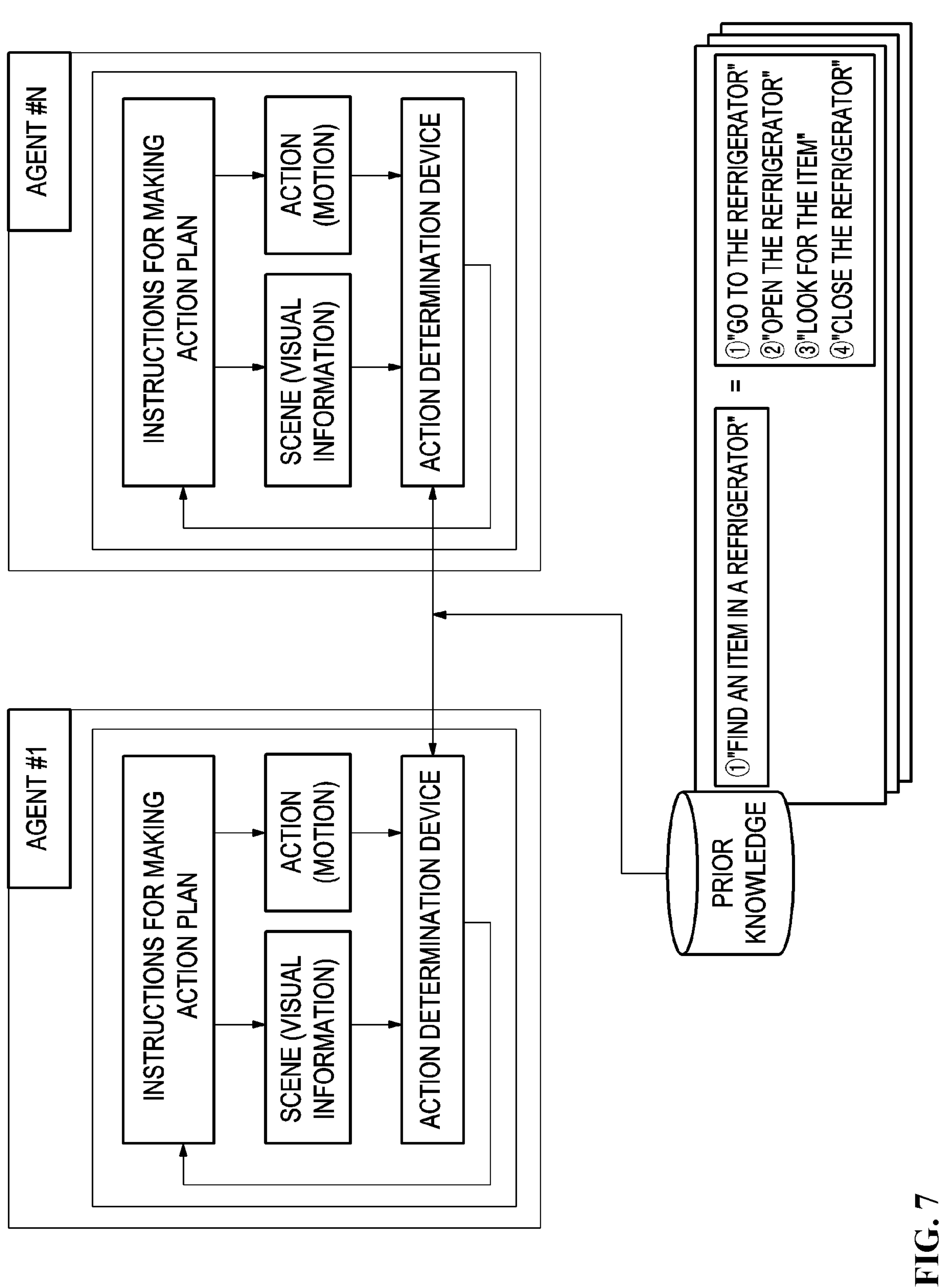
FIG. 7 is a view conceptually illustrating a step of providing feedback on performing a task and learning collaboration between agents.

FIG. 7 is a view conceptually illustrating a step of providing feedback on performing a task and learning collaboration between agents.

Referring to FIG. 7, at the step of providing feedback on performing a task and learning collaboration between agents, it is assumed that multiple agents having the above-described structure are present. That is, this step is performed by agent #1 and agent #N illustrated in the drawing. The function of receiving a human instruction and generating context and a machine-language-level instruction is installed in each of the agents, and collaboration between the multiple agents is performed whereby the multiple agents send and receive information through their action determination devices.

Each collaboration task is performed by sharing instructions for making action plans, and a specific embodiment is discussed in the scenario of a smart hospital to be described later. Also, in the existing prior knowledge, it is possible to split or merge instructions, and it is assumed that machine-level instructions are set in advance for human instructions. For example, for a human instruction "find an item in a refrigerator", machine-level instructions "go to the refrigerator", "open the refrigerator", "look for the item", "pick up the found item or determine that the item is not present", and "close the refrigerator" may be set in advance.

This includes the configuration for a method of generating a machine instruction set depending on the circumstances, rather than merely using already built machine-level instruction sets, and if a machine instruction set has been built, the built instruction set is selected depending on the context and added.

FIGS. 8 to 10 are examples of the configuration of a master plan and a subplan according to a human instruction.

Currently, as a nurse assistant, a robot merely goes to the designated place using a keypad, and this is performed in such a way that the robot simply travels along a path repeatedly based on the map possessed thereby. However, in the method according to an embodiment of the present disclosure, when a human instruction such as "deliver the medicine to the patient named "Hong Gil-Dong in room 1004" is transferred, a robot autonomously makes the actual master plan of the task and compensates for the lacking part by making a subplan, whereby action plans are made and carried out.

FIG. 9 illustrates an embodiment for generating a subplan for assisting rounds in a hospital. In the embodiment, inpatient rounds may be done in a contactless manner by making an AI agent record a conversation with a patient or check the condition of the patient according to the instructions of a doctor or a nurse, and various scenarios are possible by making action plans. Also, the AI agent performs learning through a task subplan and shares the pretrained model with other agents, thereby expanding knowledge.

FIG. 10 illustrates an embodiment of generation of a subplan for assistance in routine work in a smart hospital. In the case of assistance in routine work, a scenario in which, when a patient is not in a patient room, robots driving in the hospital receive brief information about the patient and locate the patient by collaborating with each other, may be made, and actions may be performed according to the scenario.

Figure 11:
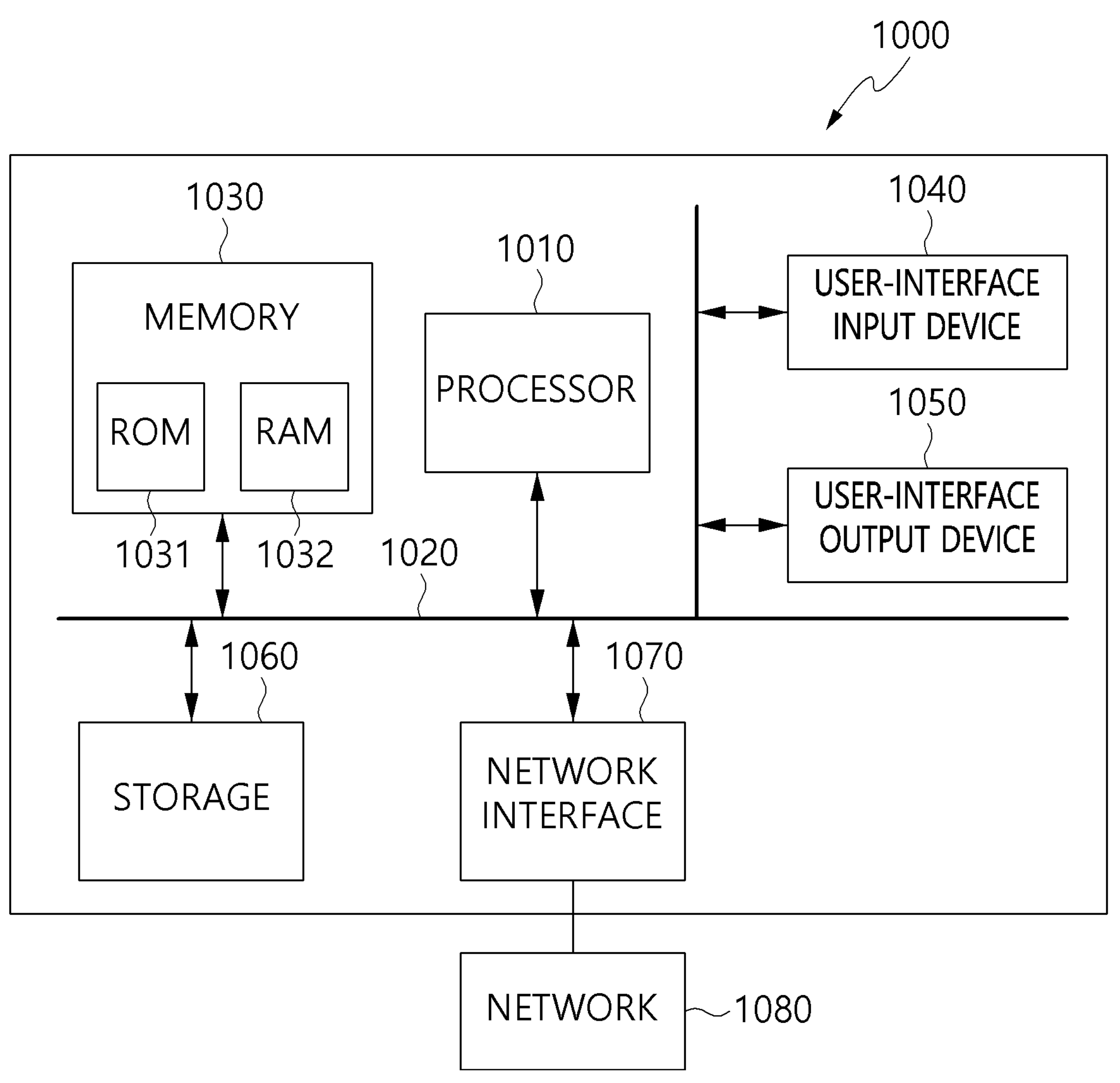
FIG. 11 is a view illustrating the configuration of a computer system according to an embodiment.

FIG. 11 is a view illustrating the configuration of a computer system according to an embodiment.

The apparatus for task planning for collaboration of AI agents according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

The apparatus for task planning for collaboration of AI agents according to an embodiment of the present disclosure includes memory 1030 in which at least one program is recorded and a processor 1010 for executing the program. The program includes instructions for performing generating a scene graph using an image acquired by an AI agent and a human instruction and generating a machine instruction set for objects in the scene graph, and the scene graph includes relevance information between each of the objects in the scene graph and the human instruction.

Here, the machine instruction set may include machine instructions corresponding to a lower level of the human instruction.

Here, generating the machine instruction set may comprise generating the machine instruction set for objects, the relevance information of which is greater than a threshold.

Here, generating the machine instruction set may comprise generating the machine instruction set based on information about an additional AI agent in the vicinity of the AI agent.

Here, the information about the additional AI agent may include information about the location thereof and information about whether collaboration is possible.

Here, generating the machine instruction set may comprise generating the machine instruction set based on the number of AI agents that are located within a preset distance from the AI agent and capable of collaborating.

Here, the program may further include an instruction for performing requesting collaboration from a nearby AI agent when the complexity of performing the machine instruction set is greater than a preset value.

Here, generating the machine instruction set may be performed using an AI neural network trained using training data configured with images, human instructions, and machine instruction sets.

Here, generating the machine instruction set may comprise estimating the number of AI agents required for performing the human instruction based on calculation of the complexity of the human instruction and generating the machine instruction set when the number of nearby AI agents capable of collaboration is greater than the number of AI agents required for performing the human instruction.

Here, generating the scene graph may comprise generating the scene graph using the image and generating a relevance map, including the relevance information between the object in the scene graph and the human instruction, based on the scene graph and the human instruction.

According to the present disclosure, a detailed task plan may be generated using visual information of an AI agent and a human instruction.

Also, the present disclosure enables a task plan to be made such that multiple AI agents are able to collaborate with each other.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for task planning for collaboration of artificial intelligence (AI) agents, comprising:

generating a scene graph using an image acquired by an AI agent;

generating a relevance map for the scene graph based on a human instruction; and generating a machine instruction set using relevance of each of a plurality of objects in the relevance map, wherein generating the relevance map comprises calculating the relevance between each of the plurality of objects in the scene graph and the human instruction using a pretrained AI neural network, and wherein generating the machine instruction set comprises requesting collaboration from an additional AI agent located within a preset distance from the AI agent when an object, the relevance of which is greater than a preset value, is not present among the plurality of objects in the relevance map.

2. The method of claim 1, wherein the machine instruction set includes machine instructions corresponding to a subtask level of the human instruction to be executed by the AI agent.

3. The method of claim 1, wherein generating the machine instruction set comprises generating the machine instruction set for objects, the relevance information of which is greater than the preset value.

4. The method of claim 1, wherein generating the machine instruction set comprises generating the machine instruction set based on information about the additional AI agent.

5. The method of claim 4, wherein the information about the additional AI agent includes information about a location thereof and information about whether collaboration is possible.

6. The method of claim 5, wherein generating the machine instruction set comprises generating the machine instruction set based on a number of AI agents that are located within the preset distance from the AI agent and capable of collaborating with the AI agent.

7. The method of claim 1, further comprising:

requesting collaboration from the additional AI agent when complexity of performing the machine instruction set is greater than a preset value.

8. The method of claim 1, wherein generating the machine instruction set is performed using an AI neural network trained using training data configured with images, human instructions, and machine instruction sets.

9. The method of claim 5, wherein generating the machine instruction set comprises estimating a number of AI agents required for performing the human instruction based on calculation of complexity of the human instruction and generating the machine instruction set when a number of additional AI agents located within the preset distance and capable of collaboration is greater than the number of AI agents required for performing the human instruction.

10. An apparatus for task planning for collaboration of artificial intelligence (AI) agents, comprising:

memory in which at least one program is recorded; and a processor for executing the program, wherein:

the program includes instructions for performing generating a scene graph using an image acquired by an AI agent, generating a relevance map for the scene graph based on a human instruction, and generating a machine instruction set using relevance of each of a plurality of objects in the relevance map, generating the relevance map comprises calculating the relevance between each of the plurality of objects in the scene graph and the human instruction using a pretrained AI neural network, and generating the machine instruction set comprises requesting collaboration from an additional AI agent located within a preset distance from the AI agent when an object, the relevance of which is greater than a preset value, is not present among the plurality of objects in the relevance map.

11. The apparatus of claim 10, wherein the machine instruction set includes machine instructions corresponding to a sub-task level of the human instruction to be executed by the AI agent.

12. The apparatus of claim 10, wherein generating the machine instruction set comprises generating the machine instruction set for objects, the relevance information of which is greater than the preset value.

13. The apparatus of claim 10, wherein generating the machine instruction set comprises generating the machine instruction set based on information about the additional AI agent.

14. The apparatus of claim 13, wherein the information about the additional AI agent includes information about a location thereof and information about whether collaboration is possible.

15. The apparatus of claim 14, wherein generating the machine instruction set comprises generating the machine instruction set based on a number of AI agents that are located within the preset distance from the AI agent and capable of collaborating with the AI agent.

16. The apparatus of claim 10, wherein the program further includes an instruction for performing requesting collaboration from the additional AI agent when complexity of performing the machine instruction set is greater than a preset value.

17. The apparatus of claim 10, wherein generating the machine instruction set is performed using an AI neural network trained using training data configured with images, human instructions, and machine instruction sets.

18. The apparatus of claim 14, wherein generating the machine instruction set comprises estimating a number of AI agents required for performing the human instruction based on calculation of complexity of the human instruction and generating the machine instruction set when a number of additional AI agents located within the preset distance and capable of collaboration is greater than the number of AI agents required for performing the human instruction.

* * * * *